(12) United States Patent
Koskinen et al.

(10) Patent No.: US 12,225,614 B2
(45) Date of Patent: Feb. 11, 2025

(54) REPORTING PRECONFIGURED UPLINK TRANSMISSION FAILURES

(71) Applicant: Nokia Technologies Oy, Espoo (FI)

(72) Inventors: Jussi-Pekka Koskinen, Oulu (FI); Chunli Wu, Beijing (CN); Samuli Turtinen, Ii (FI); Malgorzata Tomala, Wroclaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 363 days.

(21) Appl. No.: 17/796,021

(22) PCT Filed: Feb. 13, 2020

(86) PCT No.: PCT/CN2020/075149
§ 371 (c)(1),
(2) Date: Jul. 28, 2022

(87) PCT Pub. No.: WO2021/159416
PCT Pub. Date: Aug. 19, 2021

(65) Prior Publication Data
US 2023/0058523 A1    Feb. 23, 2023

(51) Int. Cl.
*H04W 76/19*    (2018.01)
*H04W 76/20*    (2018.01)

(52) U.S. Cl.
CPC ......... *H04W 76/19* (2018.02); *H04W 76/20* (2018.02)

(58) Field of Classification Search
CPC ..... H04W 24/08; H04W 24/10; H04W 72/54; H04W 76/19; H04W 76/20
See application file for complete search history.

(56) References Cited

U.S. PATENT DOCUMENTS

2017/0215188 A1   7/2017  Kim et al.
2019/0380052 A1*  12/2019 Yang .................... H04W 72/23

FOREIGN PATENT DOCUMENTS

CN    110536385 A    12/2019

OTHER PUBLICATIONS

"Work Item on NR smalldata transmissions in INACTIVE state", 3GPP TSG RAN Meeting #86, RP-193252, Agenda: 9.1.2, ZTE Corporation, Dec. 9-12, 2019, 4 pages.
"New WID on enhancement of data collection for SON/MDT in NR", 3GPP TSG RAN Meeting #86, RP-193255, Agenda: 9.1.3, CMCC, Dec. 9-12, 2019, 5 pages.

(Continued)

*Primary Examiner* — Zhensheng Zhang
(74) *Attorney, Agent, or Firm* — Robert P. Michal, Esq.; Carter, DeLuca & Farrell LLP (57) ABSTRACT

Embodiments of the present disclosure relate to reporting preconfigured uplink transmission failure. According to embodiments of the present disclosure, the terminal device logs failures associated with transmission on the preconfigured resources and failure causes. The terminal device transmits the logged information to the network device. In this way, the network device is aware of the failure occurrences and their reasons. The network device is able to use the information for configuring uplink resources more efficiently and the resources can be efficiently allocated for other purpose or other terminal devices.

1 Claim, 6 Drawing Sheets

(56) References Cited

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.8.0, Dec. 2019, pp. 1-964.
"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.
"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15)", 3GPP TS 37.320, V15.0.0, Jun. 2018, pp. 1-27.
"Universal Mobile Telecommunications System (UMTS); LTE; Universal Terrestrial Radio Access (UTRA) and Evolved Universal Terrestrial Radio Access (E-UTRA); Radio measurement collection for Minimization of Drive Tests (MDT); Overall description; Stage 2 (3GPP TS 37.320 version 11.1.0 Release 11)", ETSI TS 137 320, V11.1.0, Nov. 2012, 23 pages.
"Further consideration on non-anchor carrier measurement", 3GPP TSG-RAN2 meeting#105, R2-1901511, Agenda: 12.2.7, ZTE Corporation, Feb. 25-Mar. 1, 2019, pp. 1-3.
"Pre-configured UL Resources Design Considerations", 3GPP TSG RAN WG2 Meeting #104, R2-1817940, Agenda: 12.2.4, Sierra Wireless, Nov. 12-16, 2018, 9 pages.
"IEEE 802.11", Wikipedia, Retrieved on Aug. 5, 2022, Webpage available at : https://en.wikipedia.org/wiki/IEEE_802.11.
International Search Report and Written Opinion received for corresponding Patent Cooperation Treaty Application No. PCT/CN2020/075149, dated Nov. 18, 2020, 9 pages.
"Remaining issues for D-PUR in Idle", 3GPP TSG-RAN WG2 #108, R2-1914720, Agenda: 7.2.4, ZTE Corporation, Nov. 18-22, 2019, 4 pages.
"(Re)configuration and release of PUR", 3GPP TSG-RAN WG2 Meeting #106, R2-1906445, Agenda: 12.2.4, Qualcomm Incorporated, May 13-17, 2019, 7 pages.
Extended European Search Report received for corresponding European Patent Application No. 20919298.8, dated Dec. 22, 2022, 10 pages.
"Report of email discussion [106#59][R16 NB-IoT/eMTC] D PUR Procedural steps", 3GPP TSG-RAN WG2 Meeting#107, R2-1910173, Agenda: 12.2.4, Huawei, Aug. 6-30, 2019, 25 pages.
"Additional issues in D-PUR in RRC IDLE", 3GPP TSG RAN WG2 Meeting #108, R2-1914858, Agenda: 7.2.4, Intel Corporation, Nov. 18-22, 2019, 2 pages.
Office Action received for corresponding Indian Patent Application No. 202247051766, dated Dec. 30, 2022, 6 pages.

\* cited by examiner

REPORTING PRECONFIGURED UPLINK TRANSMISSION FAILURES

RELATED APPLICATION

This application was originally filed as PCT Application No. PCT/CN2020/075149 on Feb. 13, 2020, each of which is incorporated herein by reference in its entirety.

FIELD

Embodiments of the present disclosure generally relate to communication techniques, and more particularly, to methods, devices and computer readable medium for reporting preconfigured uplink transmission failure.

BACKGROUND

With development of communication systems, more and more technologies have been proposed. Until Release 16, a terminal device could not transmit small/infrequent data to a network device when in a radio resource control (RRC) inactive state. It has been agreed to introduce transmission of uplink data on preconfigured physical uplink shared channel (PUSCH) resources (i.e. reusing the configured grant type 1) in inactive state. Such resources can be configured for the UE using dedicated or broadcast signalling. In order to transmit small/infrequent data, the terminal device may need to transition to a RRC connected state and back to a RRC inactive state for each transmission.

SUMMARY

Generally, embodiments of the present disclosure relate to a method for reporting preconfigured uplink transmission failure and corresponding devices.

In a first aspect, there is provided a method. The method comprises receiving, at a first device and from a second device, first information indicating a set of resources preconfigured for transmission. The method further comprises in an accordance with a determination that a predetermined number of transmission failures occur on the set of resources, generating second information at least indicating the predetermined number of transmission failures and causes of the predetermined number of transmission failures. The method yet comprises transmitting the second information to the second device.

In a second aspect, there is provided a method. The method comprises transmitting, to a first device, first information indicating a set of resources preconfigured for transmission. The method further comprises receiving, from the first device, second information at least indicating a predetermined number of transmission failures detected on the set of resources and causes of the predetermined number of transmission failures. The method also comprises reallocating the set of resources based on the second information.

In a third aspect, there is provided a first device. The first device comprises at least one processor; and at least one memory including computer program codes; the at least one memory and the computer program codes are configured to, with the at least one processor, cause the first device to receive, from a second device, first information indicating a set of resources preconfigured for transmission. The first device is further caused to in an accordance with a determination that a predetermined number of transmission failures occur on the set of resources, generate second information at least indicating the predetermined number of transmission failures and causes of the predetermined number of transmission failures. The first device is yet caused to transmit the second information to the second device.

In a fourth aspect, there is provided a second device. The second device comprises at least one processor; and at least one memory including computer program codes; the at least one memory and the computer program codes are configured to, with the at least one processor, cause the second device to transmit the first information indicating a set of resources preconfigured for transmission to a first device. The second device is further caused to receive, from the first device, second information at least indicating a predetermined number of transmission failures detected on the set of resources and causes of the predetermined number of transmission failures. The second device is also caused to reallocate the set of resources based on the second information.

In a fifth aspect, there is provided an apparatus. The apparatus comprises means for receiving, at a first device and from a second device, first information indicating a set of resources preconfigured for transmission; means for in an accordance with a determination that a predetermined number of transmission failures occur on the set of resources, generating second information at least indicating the predetermined number of transmission failures and causes of the predetermined number of transmission failures; and means for transmitting the second information to the second device.

In a sixth aspect, there is provided an apparatus. The apparatus comprises means for transmitting first information indicating a set of resources preconfigured for transmission to a first device; means for receiving, from the first device, second information at least indicating a predetermined number of transmission failures detected on the set of resources and causes of the predetermined number of transmission failures; and means for reallocating the set of resources based on the second information.

In a seventh aspect, there is provided a computer readable medium comprising program instructions for causing an apparatus to perform at least the method according to the above first or second aspect.

In an eighth aspect, there is provided a computer program product that is stored on a computer readable medium and includes machine-executable instructions, wherein the machine-executable instructions, when being executed, cause the machine to perform the method according to the above first or second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.55G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, Integrated Access and Backhaul (IAB) node, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, in order to transmit small/infrequent data, the terminal device needs to transition to RRC connected state and back to RRC inactive state for each transmission. This results in wasted power consumption and signaling overhead which can be especially important for Internet of Thing (IoT) and Machine Type communication (MTC) use cases.

One solution to this problem is to transmit uplink data on preconfigured PUSCH resources (e.g., reusing a configured grant type 1 resource, such as an RRC Setup/Resume message).

In practice, uplink transmission to the network device on preconfigured uplink resources may fail for a variety of reasons. However, the terminal device does not notify the network device of such failures. As the network device is unaware of the failures, the network device is unable to configure/reconfigure uplink resources for the terminal device in an optimal manner. Receiving such feedback would enable the network device to better configure uplink resources and provide a more SON-friendly solution.

According to embodiments of the present disclosure, the terminal device logs failures associated with transmission on the preconfigured resources and failure reasons. The terminal device transmits the logged information to the network device. In this way, the network device is aware of the failure occurrences and their reasons. The network device is able to use the information for configuring uplink resources more efficiently and the resources can be efficiently allocated for other purpose or other terminal devices.

Figure 1:
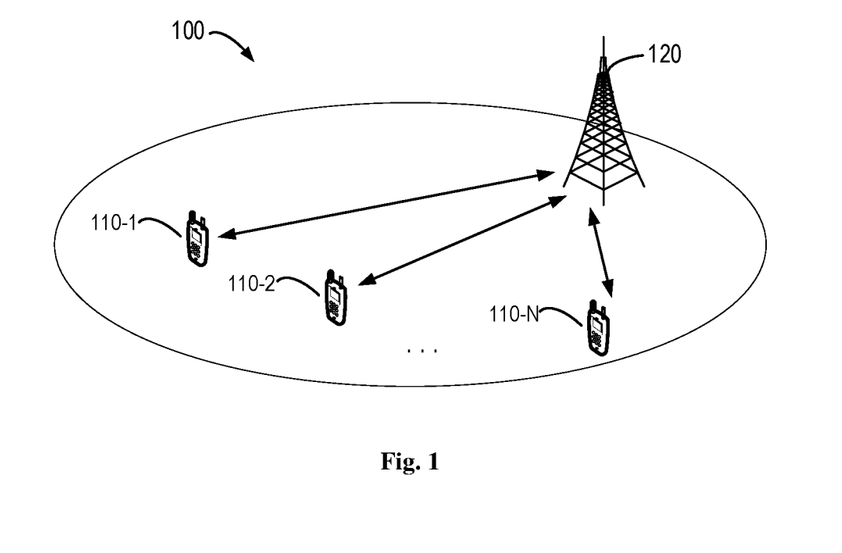
FIG. 1 illustrates a schematic diagram of a communication system according to according to embodiments of the present disclosure.

FIG. 1 illustrates a schematic diagram of a communication system in which embodiments of the present disclosure can be implemented. The communication system 100, which is a part of a communication network, comprises a device 110-1, a device 110-2, . . . , a device 110-N, which can be collectively referred to as "first device(s) 110." The communication system 100 further comprises a second device 120. One or more devices are associated with and covered by a cell. It is to be understood that the number of devices and cells shown in FIG. 1 is given for the purpose of illustration without suggesting any limitations. The communication system 100 may comprise any suitable number of devices and cells. In the communication system 100, the first device 110 and the second device 120 can communicate data and control information to each other. In the case that the first device 110 is the terminal device and the second device 120 is the network device, a link from the second device 120 to the first device 110 is referred to as a downlink (DL), while a link from the first device 110 to the second device 120 is referred to as an uplink (UL). The number of devices shown in FIG. 1 is given for the purpose of illustration without suggesting any limitations. The second device 120 and the first device 110 are interchangeable.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple Access (OFDMA) and/or any other technologies currently known or to be developed in the future.

Figure 2:
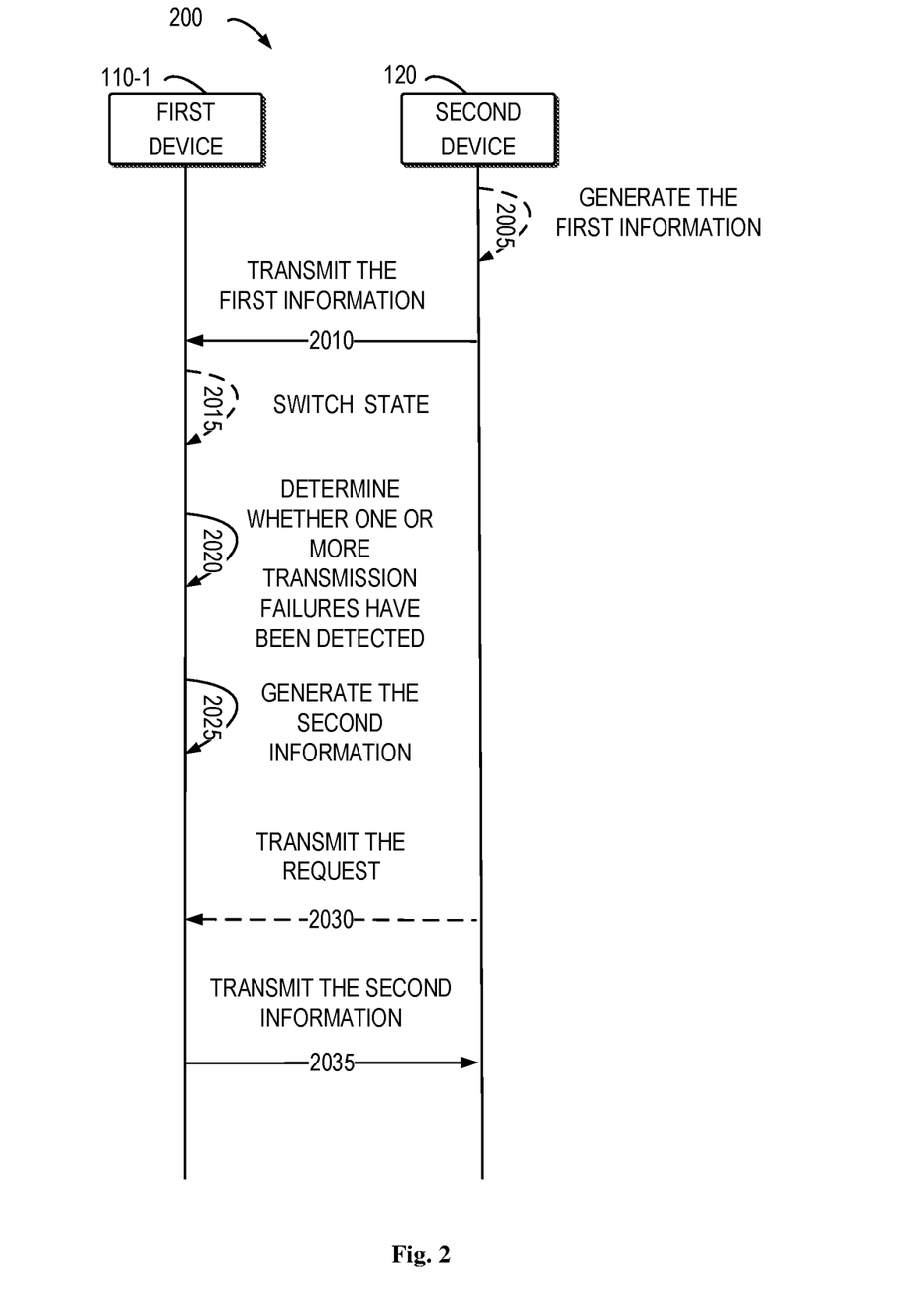
FIG. 2 illustrates a schematic diagram of interactions between devices according to according to some embodiments of the present disclosure.

FIG. 2 illustrates a schematic diagram of interactions 200 among devices in accordance with some embodiments of the present disclosure. The interactions 300 may be implemented at any suitable devices. Only for the purpose of illustrations, the interactions 300 are described to be implemented at the first device 110-1 and the second device 120.

The second device 120 may generate 2005 first information. The first information indicates a set of resources preconfigured for transmission. The set of resources may be a set of PUSCH resources. In other embodiments, the set of resources may be a configured grant. Alternatively, or in addition, the set of resources may be periodic uplink resources (PUR). In some embodiments, the set of resources may be resources with preconfigured time periodicity. In other embodiments, the first information may implicitly direct the first device 110-1 to record transmission failure on the set of resources. Alternatively, the first information may explicitly direct the first device 110-01 to record the transmission failure on the set of resources.

The second device 120 transmits 2010 the first information to the first device 110-1. In some embodiments, the second device 120 may broadcast the first information to the first device 110-1. In other embodiments, the first device 110-1 may be in RRC connected state and receive the first information in RRC signaling, for example, RRC release message or RRC release with suspend indication.

In some embodiments, the first device 110-1 may transition 2015 to the RRC inactive state. In other embodiments, the first device 110-1 may transition 2015 to idle state.

The first device 110-1 may perform uplink transmission on the set of resources. In some embodiments, the uplink transmission may comprise traffic from instant messaging services, for example, WhatsApp, QQ, WeChat, LINE. In other embodiments, the uplink transmission may comprise heart-beat/keep-alive traffic. In an example, the uplink transmission may comprise push notifications from various applications. Alternatively, the uplink transmission may comprise traffic from wearables. In other embodiments, the uplink transmission may comprise indications of sensors, for example, industrial wireless sensor networks transmitting temperature, pressure readings periodically.

The first device 110-1 may determine 2020 whether a predetermined number of transmission failures have been detected on the set of resources. In some embodiments, the first device 110-1 may detect the transmission failure by determine whether there if there is a lack of available data. If so, a transmission failure is determined to occur.

Alternatively, in other embodiments, if there is lack of certain type of data available (for example, suitable for preconfigured uplink transmission), the first device 110-1 can determine that a transmission failure occurs. In yet other embodiments, if there is no acknowledgment (ACK) received from the second device 120, a transmission failure is detected. Alternatively, or in addition, in some embodiments, if the configuration for the uplink transmission is not available, the first device 110-1 may determine that there is a transmission failure.

In some embodiments, the timing advance before the transmission may be used in transmission failure detection. That is, if there is a lack of valid timing advance, the transmission failure occurs. Alternatively, or in addition, if the listen before talk (LBT) failed upon transmission attempt, the first device 110-1 can determine a transmission failure occurs.

The first device 110-1 may detect the transmission failure by determining the RRC state of the first device 110-1. For example, if the first device 110-1 is in RRC idle state, the first device 110-1 may detect the transmission failure on the PUR. Alternatively, if the first device 110-1 is in RRC inactive state, the first device 110-1 may detect the transmission failure on the preconfigured resources. In other embodiments, when the first device is in RRC connected state, the first device 110-1 may detect the transmission failure on the configured grant.

In accordance with embodiments of the present disclosure, if the first device 110-1 detects the predetermined number of transmission failures, second information is generated 2025. In some embodiments, if any one transmission failure on the set of resources is detected, the second information may be generated. Alternatively, in other embodiments, the predetermined number may be greater than one. That is, the second information is generated if a plurality of transmission failures of the predetermined number have been detected.

The second information at least indicates the predetermined number of transmission failures and the causes of the predetermined number of transmission failures. For example, as discussed above, the causes may comprise one or more of: lack of uplink data available, lack of certain uplink data available (suitable for preconfigured UL transmission), lack of ACK received from the second device 120, lack of available configuration for the transmission, lack of valid timing advance, a LBT failure. In some embodiments, the second information may be generated per RRC state. For example, if the first device 110-1 is in RRC inactive state, the first device 110-1 may generate the second information. If the first device 110-1 is switched to RRC idle state, the first device 110-1 may also generate the second information related to the RRC idle state.

In some embodiments, the second information may comprise one or more time stamps associated with the predetermined number of transmission failures. Alternatively or in addition, the second information may comprise a location of the first device 110-1.

In other embodiments, the second information may comprise one or more RRC states associated with the predetermined number of transmission failures. The second information may comprise one or more transmission failures and corresponding causes of the one or more transmission failures.

The first device 110-1 transmits the 2035 the second information to the second device 120. The first device 110-1 may transmit the second information immediately. Alternatively, the first device 110-1 may transmit the second information after receiving a request from the second device 120. For example, after the second device 120 may transmit 2030 a request for the second information to the first device 110-1, the first device 110-1 transmits the second information to the second device 120. In some embodiments, the request may indicate the first device 110-1 to report the transmission failure specific to a certain failure cause.

In some embodiments, the first device 110-1 may transmit the second information to the second device 120 via dedicated signaling. For example, the second information may be transmitted via RRC signaling. In some embodiments, the first device 110-1 may transmit the second information in the current RRC connection between the first device 110-1 and the second device 120. Alternatively, the first device 110-1 may transmit the second information in a subsequent RRC connection. In other embodiments, the first device 110-1 may transmit the second information on next uplink transmission.

The first device 110-1 may include the second information into the RRC setup request and transmit the RRC setup request to the second device 120. In an example embodiment, the second information may be included into the RRC resume request and the first device 110-1 may transmit the RRC resume request to the second device 120. Alternatively, the first device 110-1 may include the second information into the RRC setup complete message and transmit the RRC setup complete message to the second device 120. In yet other embodiments, the first device 110-1 may include the second information into the RRC resume complete message and transmit the RRC resume complete message to the second device 120. In some embodiments, the second information may be included in the RRC message used for the uplink transmission on the set of preconfigured resources. Alternatively, in some embodiments, the first device 110-1 may include the second information into a UE assistance information message.

In some embodiments, the first device 110-1 may transmit availability information to the second device 120 to indicate that the second information is available. Based on the availability information, the network device 120 may determine to obtain a part of second information related to a certain failure cause. For example, the second device 120 may request a portion of the second information based on the failure cause.

Figure 3:
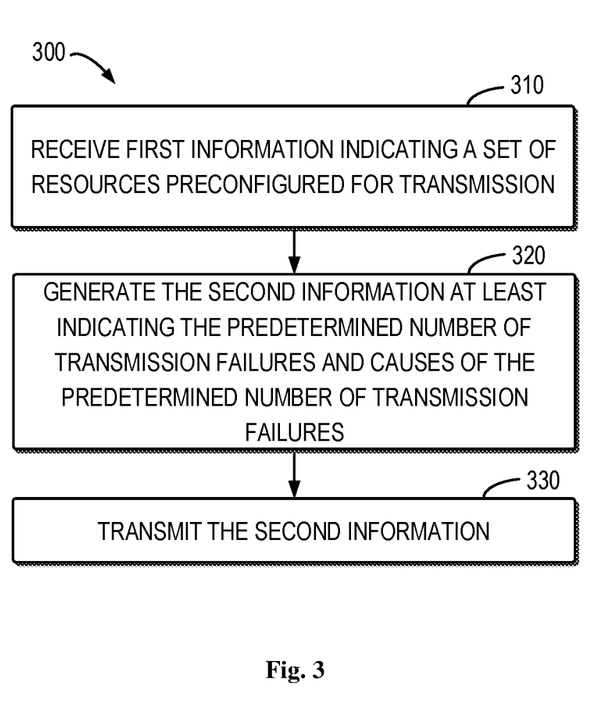
FIG. 3 illustrates a flow chart of a method according to embodiments of the present disclosure.

FIG. 3 illustrates a flow chart of method 300 according to embodiments of the present disclosure. The method 300 can be implemented at any suitable devices. For example, the method may be implemented at the first device 110-1.

At block 310, the first device 110-1 receives the first information from the second device 120. In some embodiments, the first device 110-1 may be in RRC connected state and receive the first information in RRC signaling, for example, RRC release message or RRC release with suspend indication. Alternatively, the first information may be broadcasted.

The first device 110-1 may perform uplink transmission on the set of resources. In some embodiments, before performing the uplink transmission, the first device 110-1 may transition to the RRC inactive state. In other embodiments, the first device 110-1 may transition to idle state before performing the uplink transmission.

In some embodiments, the uplink transmission may comprise traffic from instant messaging services, for example, WhatsApp, QQ, WeChat, LINE. In other embodiments, the uplink transmission may comprise heart-beat/keep-alive traffic. In an example embodiment, the uplink transmission may comprise push notifications from various applications.

Alternatively, the uplink transmission may comprise traffic from wearables. In yet other embodiments, the uplink transmission may comprise indications of sensors, for example, industrial wireless sensor networks transmitting temperature, pressure readings periodically.

In some embodiments, the first device 110-1 may determine whether a predetermined number of transmission failures have been detected on the set of resources. In some embodiments, if there is a lack of available data, a transmission is determined to occur. In other embodiments, if there is a lack of certain type of data available (for example, suitable for preconfigured uplink transmission), the first device 110-1 determines that the transmission failure occurs. Alternatively, in other embodiments, if there is no ACK received from the second device 120, a transmission failure is detected. Alternatively or in addition, if the configuration for the transmission is not available, the first device 110-1 may determine that there is a transmission failure.

In some embodiments, the timing advance before the transmission may be used for detecting the transmission failure. For example, if there is a lack of valid timing advance, the transmission failure is determined to occur. Alternatively, if the LBT failed upon transmission attempt, the first device 110-1 may detect that the transmission failure occurs.

The first device 110-1 may detect the transmission failure by determining the RRC state of the first device 110-1. For example, if the first device 110-1 is in RRC idle state, the first device 110-1 may detect the transmission failure on the PUR. Alternatively, if the first device 110-1 is in RRC inactive state, the first device 110-1 may detect the transmission failure on the preconfigured resources. In other embodiments, when the first device is in RRC connected state, the first device 110-1 may detect the transmission failure on the configured grant.

At block 320, the first device 110-1 generates the second information if the predetermined number of transmission failures are detected on the set of resources. In some embodiments, if any one transmission failure on the set of resources is detected, the second information may be generated. Alternatively, in other embodiments, the predetermined number may be greater than one. That is, the second information is generated if a plurality of transmission failures of the predetermined number have been detected.

The second information at least indicates the predetermined number of transmission failures and the causes of the predetermined number of transmission failures. For example, as discussed above, the causes may comprise one or more of: lack of uplink data available, lack of certain uplink data available (suitable for preconfigured UL transmission), lack of ACK from the second device 120, lack of available configuration for the transmission, lack of valid timing advance, a LBT failure. In some embodiments, the second information may be generated per RRC state.

In some embodiments, the second information may comprise one or more time stamps of the predetermined number of transmission failures. Alternatively or in addition, the second information may comprise a location of the first device 110-1. The second information may comprise one or more transmission failures and corresponding causes of the one or more transmission failures. The second information may also comprise one or more RRC states associated with the predetermined number of transmission failures.

At block 330, the first device 110-1 transmits the second information to the second device 120. The first device 110-1 may transmit the second information immediately. In other embodiments, the first device 110-1 may transmit the second information after receiving a request from the second device 120.

In some embodiments, the first device 110-1 may transmit the second information to the second device 120 via dedicated signaling. For example, the second information may be transmitted via RRC signaling. In some embodiments, the first device 110-1 may transmit the second information in the current RRC connection. Alternatively, the first device 110-1 may transmit the second information in the subsequent RRC connection. In other embodiments, the first device 110-1 may transmit the second information on subsequent uplink transmission.

The first device 110-1 may include the second information into the RRC setup request and transmit the RRC setup request to the second device 120. In an example embodiment, the first device 110-1 may include the second information into the RRC resume request and transmit the RRC resume request to the second device 120. Alternatively, the first device 110-1 may include the second information into the RRC setup complete message and transmit the RRC setup complete message to the second device 120. In yet other embodiments, the first device 110-1 may include the second information into the RRC resume complete message and transmit the RRC resume complete message to the second device 120. In some embodiments, the second information may be included in the RRC message used for the uplink transmission on the set of preconfigured resources. Alternatively, the second information may be included into a UE assistance information message.

In some embodiments, the first device 110-1 may transmit availability information to the second device 120 to indicate that the second information is available. The first device 110-1 may receive a request for reporting a portion of the second information based on the failure cause and transmit the portion of the second information to the second device 120.

Figure 4:
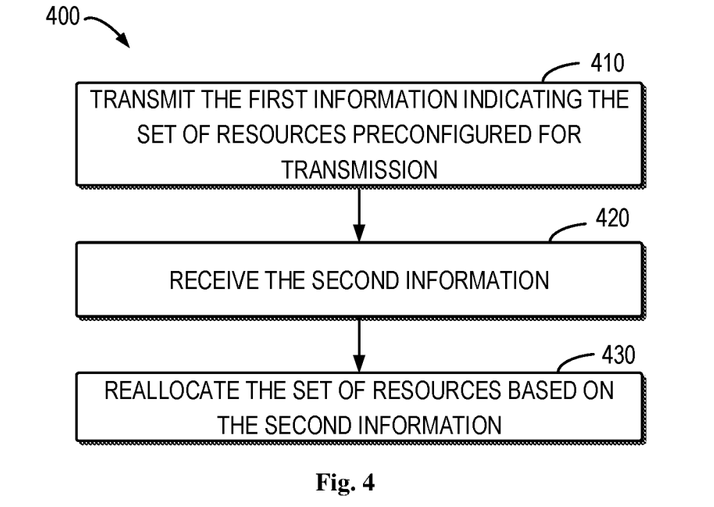
FIG. 4 illustrates a flow chart of a method according to embodiments of the present disclosure.

FIG. 4 illustrates a flow chart of method 400. The method 400 can be implemented at any suitable devices. For example, the method may be implemented at the second device 120.

In some embodiments, the second device 120 may generate first information. The first information indicates a set of resources preconfigured for transmission. The set of resources may be a set of PUSCH resources. In other embodiments, the set of resources may be a configured grant. Alternatively or in addition, the set of resources may be PUR. In some embodiments, the set of resources may be resources with preconfigured time periodicity. In other embodiments, the first information may implicitly direct the first device 110-1 to record transmission failure on the set of resources. Alternatively, the first information may explicitly direct the first device 110-01 to record the transmission failure on the set of resources.

At block 410, the second device 120 transmits the first information to the first device 110-1. In some embodiments, the second device 120 may broadcast the first information to the first device 110-1. In other embodiments, the second device 120 may transmit the first information in dedicated signaling.

At block 420, the second device 120 receives second information at least indicating a predetermined number of transmission failures detected on the set of resources and the causes of the predetermined number of transmission failures. For example, as discussed above, the causes may comprise one or more of lack of uplink data available, lack of certain uplink data available (suitable for preconfigured UL transmission), lack of ACK from the second device 120, lack of available configuration for the transmission, lack of valid timing advance, a LBT failure upon transmission attempt (in unlicensed spectrum). In some embodiments, the second information may be generated per RRC state.

In some embodiments, the second information may comprise one or more time stamps associated with the predetermined number of transmission failures. Alternatively or in addition, the second information may comprise a location of the first device 110-1. The second information may comprise one or more transmission failures and corresponding failure causes of the one or more transmission failures. In other embodiments, the second information may comprise one or more RRC states associated with the predetermined number of transmission failures.

In some embodiments, the second information may be transmitted via dedicated signaling, for example, RRC signaling. In some embodiments, the second information may be transmitted in the current RRC connection between the first device 110-1 and the second device 120. Alternatively, the second information may be transmitted in subsequent RRC connection between the first device 110-1 and the second device 120. In other embodiments, the second information may be transmitted on next uplink transmission.

The second information may be transmitted the RRC setup request. In an example embodiment, the second information may be transmitted in the RRC resume request. Alternatively, the second information may be transmitted in the RRC setup complete message. In other embodiments, the second information may be transmitted in the RRC resume complete message. In some embodiments, the second information may be transmitted in the RRC message used for the uplink transmission on the set of preconfigured resources.

In some embodiments, the second device 120 may receive availability information from the first device 110-1 to indicate that the second information is available. The second device 120 may transmit a request for a portion of the second information based on the failure cause and receive the portion of the second information from the first device 110-1.

At block 430, the second device 120 reallocates the set of resources based on the second information. For example, if the second information indicates that most of the transmission failures were caused by a lack of data, the second device 120 may reallocate less resources for the transmission. In other embodiments, if the second information indicates that most of the transmission failures were caused by a lack of certain type of data, the second device 120 may reallocate less resources for the certain type of services which need the certain type of data. In some embodiments, if the second information indicates that the configuration is not available, the second device 120 may reallocate more resources. In this way, the second device 120 can use the information for configuring uplink resources more efficiently. PUSCH resources can be efficiently allocated for other purposes or for other UEs.

In embodiments, an apparatus for performing the method 300 (for example, the first device 110-1) may comprise respective means for performing the corresponding steps in the method 300. These means may be implemented in any suitable manners. For example, it can be implemented by circuitry or software modules.

In some embodiments, the apparatus comprises means for receiving, from a second device, first information indicating a set of resources preconfigured for transmission; means for in an accordance with a determination that a predetermined number of transmission failures occur on the set of resources, generating second information at least indicating the predetermined number of transmission failures and causes of the predetermined number of transmission failures; and means for transmitting the second information to the second device.

In some embodiments, the second information further indicates at least one of: one or more time stamps associated with the predetermined number of transmission failures, a location of the first device, or one or more radio resource control (RRC) states associated with the predetermined number of transmission failures.

In some embodiments, the apparatus further comprises means for detecting the predetermined number of transmission failures by detecting at least one of the following: lack of available data, lack of ACK from the second device 120, lack of available configuration for the transmission, lack of valid timing advance, or a failure of listen-before-talk.

In some embodiments, the means for transmitting the second information to the second device comprises: and means for transmitting at least part of the second information to the second device in response to a request received from the second device.

In some embodiments, the means for transmitting the second information to the second device comprises: means for transmitting the second information via radio resource control (RRC) signaling.

In some embodiments, the means for transmitting the second information via the RRC signaling comprises: means for transmitting the second information in a current RRC connection between the first device and the second device or a subsequent RRC connection between the first device and the second device.

In some embodiments, the means for transmitting the second information via the RRC signaling comprises: means for including the second information into at least one of the following: a RRC setup request, a RRC resume request, a RRC setup complete message, a RRC resume complete message, or a UE assistance information message.

In some embodiments, the means for transmitting the second information to the second device comprises means for transmitting the second information via dedicated signaling.

In some embodiments, the set of resources comprises at least one of: physical uplink shared channel (PUSCH) resource, a configured grant, or periodic uplink resources.

In some embodiments, the apparatus further comprises means for detecting the transmission failure by determining if the first device is in one of a RRC idle state, a RRC inactive state, or a RRC connected state.

In some embodiments, the second information comprises a plurality of transmission failures and corresponding causes caused the plurality of failures.

In some embodiments, the first device comprises a terminal device and the second device comprises a network device.

In embodiments, an apparatus for performing the method 400 (for example, the second device 120) may comprise respective means for performing the corresponding steps in the method 400. These means may be implemented in any suitable manners. For example, it can be implemented by circuitry or software modules.

In some embodiments, the apparatus comprises means for transmitting, to a first device, first information indicating a set of resources preconfigured for transmission; means for receiving, from the first device, second information at least indicating a predetermined number of transmission failures detected on the set of resources and causes of the predetermined number of transmission failures; and means for reallocating the set of resources based on the second information.

In some embodiments, the second information further indicates at least one of the following: one or more time stamps associated with the predetermined number of transmission failures, a location of the first device, or one or more radio resource control (RRC) states associated with the predetermined number of transmission failures.

In some embodiments, the causes comprise at least one of the following: lack of available data, lack of acknowledgment from the second device, lack of valid timing advance, lack of available configuration for the transmission, or failure of listen-before-talk.

In some embodiments, the apparatus further comprises means for transmitting a request for reporting the second information to the first device.

In some embodiments, the request indicates to report at least part of the second information based on the causes.

In some embodiments, the means for receiving the second information comprises means for receiving the second information via RRC signaling.

In some embodiments, the means for r receiving the second information via the RRC signaling means for receiving the second information in a current RRC connection between the first device and the second device or a subsequent RRC connection between the first device and the second device.

In some embodiments, the means for receiving the second information comprises means for obtaining the second information from at least one of the following: a RRC setup request, a RRC resume request, a RRC setup complete message, a RRC resume complete message or a UE information response message.

In some embodiments, the means for receiving the second information comprises means for receiving the second information via dedicated signaling.

In some embodiments, the set of resources comprises at least one of: physical uplink shared channel (PUSCH) resources, a configured grant, or periodic uplink resources.

In some embodiments, the second information comprises a plurality of transmission failures and corresponding causes caused the plurality of failures.

In some embodiments, the first device comprises a terminal device and the second device comprises a network device.

Figure 5:
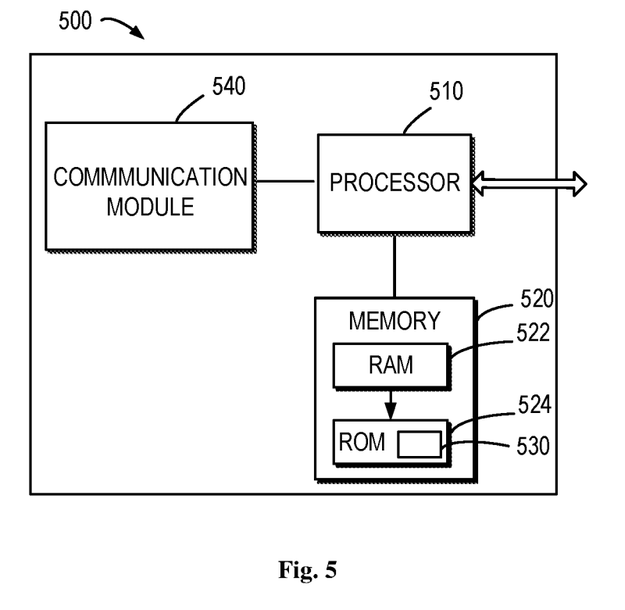
FIG. 5 illustrates a simplified block diagram of an apparatus that is suitable for implementing embodiments of the present disclosure.

FIG. 5 is a simplified block diagram of a device 500 that is suitable for implementing embodiments of the present disclosure. The device 500 may be provided to implement the communication device, for example the first device 110 or the second device 120 as shown in FIG. 1. As shown, the device 500 includes one or more processors 510, one or more memories 520 coupled to the processor 510, and one or more communication modules 540 coupled to the processor 510.

The communication module 540 is for bidirectional communications. The communication module 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 524. The processor 510 may perform any suitable actions and processing by loading the program 530 into the RAM 522.

The embodiments of the present disclosure may be implemented by means of the program 520 so that the device 500 may perform any process of the disclosure as discussed with reference to FIGS. 2 and 4. The embodiments of the present disclosure may also be implemented by hardware or by a combination of software and hardware.

Figure 6:
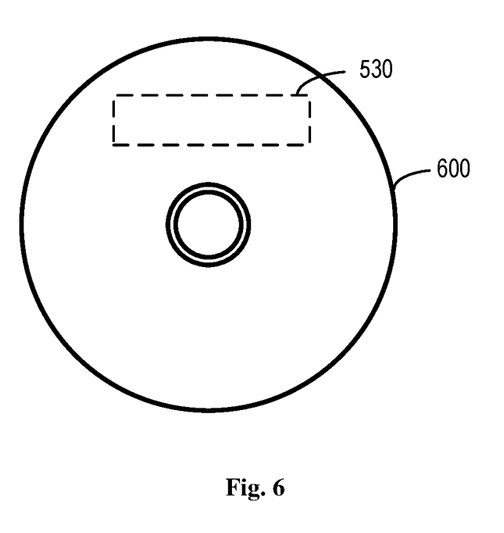
FIG. 6 illustrates a block diagram of an example computer readable medium in accordance with some example embodiments of the present disclosure.

In some example embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like. FIG. 6 shows an example of the computer readable medium 600 in form of CD or DVD. The computer readable medium has the program 530 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labor between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the device 500 may be comprised in a central unit (e.g. a control unit, an edge cloud server, a server) operatively coupled (e.g. via a wireless or wired network) to a distributed unit (e.g. a remote radio head/ node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or radio access networks. In an embodiment, at least some of the described processes may be performed by the central unit. In another embodiment, the device 500 may be instead comprised in the distributed unit, and at least some of the described processes may be performed by the distributed unit.

In an embodiment, the execution of at least some of the functionalities of the device 500 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the device 500 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 300 and 400 as described above with reference to FIGS. 3 and 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:
1. A method comprising:
receiving, at a first device and from a second device, first information indicating a set of resources preconfigured for transmission;
in an accordance with a determination that a predetermined number of transmission failures occur on the set of resources, generating second information at least indicating the predetermined number of transmission failures and causes of the predetermined number of transmission failures;

transmitting the second information to the second device for reallocating the set of resources, wherein transmitting the second information to the second device comprises:
  transmitting the second information via radio resource control (RRC) signaling, wherein transmitting the second information via the RRC signaling comprises:
  including the second information into: a RRC setup request, a RRC resume request, a RRC setup complete message, a RRC resume complete message, and a user equipment (UE) assistance information message;
detecting the predetermined number of transmission failures by detecting: lack of available data, lack of acknowledgment from the second device, lack of available configuration for the transmission, lack of valid timing advance, and a failure of listen-before-talk,
wherein the second information further indicates at least one of the following: one or more time stamps associated with the predetermined number of transmission failures, a location of the first device, or one or more radio resource control (RRC) states associated with the predetermined number of transmission failures; and
detecting the predetermined number of transmission failures by determining if the first device is in one of the following: a RRC idle state, a RRC inactive state, or a RRC connected state.

\* \* \* \* \*